United States Patent Office 3,005,796
Patented Oct. 24, 1961

3,005,796
BLEND OF POLYVINYL CHLORIDE AND BUTADI-
ENE-STYRENE COPOLYMERS AND METHOD
OF MAKING SAME
Robert R. Dreisbach, Midland, Maurice J. Gifford, Free-
land, and Paul H. Lipke and George B. Sterling, Mid-
land, Mich., assignors to The Dow Chemical Company,
Midland, Mich., a corporation of Delaware
No Drawing. Filed May 5, 1958, Ser. No. 732,801
7 Claims. (Cl. 260—45.5)

This invention concerns compositions of polyvinyl chloride plasticized with a minor proportion of a rubbery copolymer comprising butadiene and a monovinyl aromatic hydrocarbon, e.g. styrene.

This application is a continuation-in-part of our copending application Serial No. 569,248, filed March 5, 1956, now abandoned.

Polyvinyl chloride is commonly plasticized to increase its flexibility and elastic properties and provide compositions suitable for calendering into thin sheets or films. Among the plasticizers generally used are high boiling liquid esters such as tricresyl phosphate, trioctyl phosphate, dioctyl phthalate, etc. U.S. Patent No. 2,656,333 makes compositions of polyvinyl chloride plasticized with copolymers of one or more conjugated diolefins and monovinyl carbonyl-containing monomers such as acetyl styrene, methacrolein or unsaturated aliphatic and mixed aliphatic aromatic ketones, e.g. methyl vinyl ketone, methyl isopropenyl ketone or vinyl phenyl ketone. The patent discloses that acrylonitrile-diolefin copolymers have been considered to be specific plasticizers for polyvinyl chloride and teaches that other rubbery polymers such as polyisobutylene, copolymers of isoprene or butadiene and isobutylene or GR–S rubber (butadiene-styrene copolymer) are incompatible with polyvinyl chloride and that films formed of such mixtures are cloudy and have poor physical properties.

It has now been discovered that rubbery copolymers comprising butadiene-1,3 and one or more monovinyl aromatic compounds of the benzene series, e.g. styrene, vinyltoluene, or dichlorostyrene, which copolymers contain from 40 to 60 percent by weight of butadiene chemically combined or interpolymerized with from 60 to 40 percent of at least one monovinyl aromatic compound or a mixture of methyl isopropenyl ketone and at least one monovinyl aromatic compound can readily be incorporated with polyvinyl chloride to produce transparent or substantially transparent compositions having good physical properties, e.g. high impact strength.

It is important that the rubbery copolymers contain at least 40 percent by weight of butadiene and not more than 60 percent of one or more copolymerizable monomers selected from the group consisting of monovinyl aromatic compounds of the benzene series, e.g. styrene or chlorostyrene, or not more than 60 percent of a mixture of methyl isopropenyl ketone and a monovinyl aromatic compound, which mixture consists of from 10 to 90 percent by weight of at least one monovinyl aromatic compound and from 10 to 90 percent of methyl isopropenyl ketone. Examples of suitable monovinyl aromatic compounds are styrene, vinyltoluene, vinylxylene, ethylvinylbenzene, isopropylstyrene, ar-ethylvinyltoluene, chlorostyrene, dichlorostyrene, ethylchlorostyrene, ar-chlorovinyltoluene or diethylstyrene. Mixtures of any two or more of such monovinyl aromatic compounds or mixtures of one or more of the monovinyl aromatic compounds and methyl isopropenyl ketone can also be used. The methyl isopropenyl ketone is employed in amount corresponding to from 4 to 54, preferably from 10 to 30, percent by weight of the polymerizable components of the rubbery copolymer.

The rubbery copolymer of butadiene-1,3 and a monovinyl aromatic compound can be prepared by copolymerizing the ingredients in the desired proportions in usual ways. The rubbery copolymer can be prepared by polymerizing the monomeric materials in an aqueous emulsion employing a redox type recipe, i.e. a formulation wherein both oxidizing and reducing components are present. The copolymer is recovered in usual ways, e.g. by coagulating the latex and washing and drying the copolymer.

The plasticity of the rubbery copolymers can be regulated by incorporating modifiers into the emulsion polymerization system. The usual modifiers include long chain or branched chain aliphatic mercaptans such as dodecyl mercaptan or tertiary mercaptans containing from 12 to 16 carbon atoms in the molecule. The mercaptan modifiers are usually employed in amount corresponding to from 0.01 to 2 percent by weight of the monomeric material.

The proportion of the rubbery copolymer to be incorporated with the polyvinyl chloride can be varied from 5 to 15 percent by weight of the rubbery copolymer and from 95 to 85 percent by weight of the polyvinyl chloride, based on the sum of the weights of the rubbery copolymer and the polyvinyl chloride employed. Compositions of greater or lesser proportions of the rubbery copolymer do not possess the high impact strength possessed by the compositions of the invention.

The compositions are prepared by heat-plastifying and mechanically working the polymeric ingredients in the desired proportions in admixture with one another on compounding rolls, a Banbury mixer or a plastics extruder until a uniform composition is obtained.

It is important in preparing the compositions that the polyvinyl chloride be heat-plastified at temperatures near its melting point prior to admixing the rubbery copolymer therewith in order to obtain compositions possessing transparency and good physical properties, e.g. a high impact strength. This can be accomplished by first heat-plastifying or milling the polyvinyl chloride at its melting temperature or thereabout on compounding rolls, in a Banbury mixer or a plastics extruder and after the polyvinyl chloride is substantially molten throughout adding the rubbery copolymer to the molten polyvinyl chloride and mechanically working the heat-plastified ingredients into a uniform composition. The polymeric ingredients can be compounded or mechanically blended into a uniform composition at temperatures between 165° and 225° C.

The rubbery copolymer is usually the sole plasticizer employed in preparing the compositions of the invention. However, the rubbery copolymers may be employed together with one or more high boiling liquid plasticizers such as dioctyl phthalate, tricresyl phosphate, etc. although the presence of such liquid plasticizers is not required.

Usually a stabilizing agent such as tin maleate, dibutyl tin dilaurate, dibutyl tin-S,S'-bis(3,5,5-trimethylhexyl mercapto acetate) or a mixture of barium and cadmium stearates is incorporated with the polymeric ingredients to prevent or inhibit deterioration of the polyvinyl chloride.

Small amounts of other additives such as pigments, fillers, colors, lubricants, or mold release agents, e.g. white mineral oil or butyl stearate, may be included in the compositions, but such additives are not required.

The following examples illustrate ways in which the principle of the invention has been applied, but are not to be construed as limiting its scope.

EXAMPLE 1

*Preparation of copolymer of butadiene and styrene.*—
A copolymer of butadiene and styrene was prepared by polymerizing a mixture of the monomers in an aqueous emulsion employing the following recipe:

| | Parts by weight |
|---|---|
| Butadiene | 50 |
| Styrene | 50 |
| Water | 200 |
| Dresinate 214 [1] | 7.2 |
| Sodium sulfoxylate formaldehyde | 0.2 |
| Versene [2] | 0.4 |
| Diisopropylbenzene hydroperoxide | 0.8 |
| Mercaptan [3] | 0.3 |
| KCl | 0.3 |
| KOH | 0.2 |
| $FeCl_3 \cdot 6H_2O$ | 0.2 |

[1] Potassium salt of disproportionated rosin acid.
[2] Sodium salt of ethylenediamine tetracetic acid.
[3] Tert.—$C_{12}SH$ 60 parts; tert.—$C_{14}SH$ 20 parts; and tert.—$C_{16}SH$ 20 parts.

The ingredients were placed in a closed vessel, agitated to effect emulsification and the monomers polymerized by heating the mixture at a temperature of 5° C. for a period of 4 hours. Thereafter, the latex was removed and 1.5 parts of Agerite Resin D (polytrimethylquinoline) added as antioxidant. The copolymer was recovered by coagulating the latex, and was washed and dried. The monomers were completely polymerized. The copolymer was a nearly transparent rubbery solid.

*Preparation of polyvinyl chloride composition.*—A charge of 100 parts by weight of powdered polyvinyl chloride, 3 parts of dibutyl tin-S,S'-bis(3,5,5-trimethylhexyl mercapto acetate) as stabilizer and 1 part of white mineral oil was blended at room temperature to form a uniform mixture. A charge of 100 parts by weight of the mixture was milled on compounding rollls for a period of about 2 minutes at a temperature of 340° F. Thereafter, 10 parts by weight of the rubbery copolymer of 50 percent butadiene and 50 percent styrene prepared above was added to the heat-plastified polyvinyl chloride on the compounding rolls. The resulting mixture was milled on the rolls at 340° F. for a period of 10 minutes, then was removed and allowed to cool. The product was a uniform composition. A portion of the composition was compression molded to form a sheet ⅛ inch thick. The molded sheet was transparent. Test pieces of ⅛x½ inch cross section by 2⅜ inches long were cut from the sheet. These test pieces were used to determine a notched impact strength value for the composition employing a procedure similar to that described in ASTM D256–47T. The composition had a notched impact strength of 19.7 foot-pounds per inch of notch.

A similar composition prepared from 100 parts by weight of stablized polyvinyl chloride and 10 parts of a rubbery copolymer of 40 percent by weight of butadiene and 60 percent of styrene formed transparent molded articles. The composition had an impact strength value of 15.8 foot-pounds per inch of notch.

A composition prepared from 100 parts of polyvinyl chloride and 10 parts of a copolymer of 60 percent by weight of butadiene and 40 percent styrene formed transparent molded articles which had an impact strength of 18.7 foot-pounds per inch of notch.

In contrast, a composition prepared from 100 parts by weight of polyvinyl chloride and 10 parts of GR–S 1006 rubber (a copolymer of about 73.5 percent by weight of butadiene and 26.5 percent of styrene) was opaque and had an impact strength value of only 1.1 foot-pounds per inch of notch.

EXAMPLE 2

In each of a series of experiments, 100 grams of a mixture of 100 parts by weight of polyvinyl chloride, 3 parts of stablizer and 1 part of white mineral oil was milled on compounding rolls at a temperature of 340° F. to heat-plastify the polyvinyl chloride. Thereafter, 10 grams of a rubbery copolymer of butadiene, styrene and methyl isopropenyl ketone as defined in the following table was added to the heat-plastified polyvinyl chloride on the rolls. The resulting mixture was milled on the compounding rolls at a temperature of 340° F. for a period of 10 minutes, then was removed, allowed to cool and ground to a granular form suitable for molding. A portion of the composition was compression molded to form test pieces of ⅛x½ inch cross section. These test pieces were employed to determine a notched impact strength value for the composition by procedure similar to that described in ASTM D256–47T. The rubbery copolymers employed in the experiments were prepared by polymerizing a mixture of butadiene, styrene and methyl isopropenyl ketone in proportions as stated in the following table in an aqueous emulsion employing a procedure and recipe similar to that described in Example 1. Table I identifies the rubbery copolymer by giving the proportions of monomeric ingredients employed in preparing the same. The table gives the parts by weight of the rubbery copolymer and the stabilized polyvinyl chloride employed in making the composition and a notched impact strength value for the composition. All of the compositions formed transparent molded plastic articles. The letters MIK in the table represent methyl isopropenyl ketone.

*Table I*

| | Copolymer | | | Composition | | Product | |
|---|---|---|---|---|---|---|---|
| Run No. | Monomer Starting Materials | | | Polymer Starting Materials | | Properties | |
| | MIK, percent | $C_4H_6$ percent | Styrene, percent | Copolymer, wt. gms. | Polyvinyl chloride, wt. gms. | Notched Impact Strength, ft. lbs. | Color |
| 1 | 5 | 50 | 45 | 10 | 100 | 10.3 | Clear. |
| 2 | 10 | 50 | 40 | 10 | 100 | 17.7 | Do. |
| 3 | 15 | 50 | 35 | 10 | 100 | 17.5 | Do. |
| 4 | 20 | 50 | 30 | 10 | 100 | 23.4 | Do. |
| 5 | 25 | 50 | 25 | 10 | 100 | 16.7 | Do. |
| 6 | 30 | 45 | 25 | 10 | 100 | 14.6 | Do. |
| 7 | 5 | 55 | 40 | 10 | 100 | 19.9 | Do. |
| 8 | 10 | 60 | 30 | 10 | 100 | 24.2 | Do. |
| 9 | 15 | 60 | 25 | 10 | 100 | 19.4 | Do. |
| 10 | 30 | 40 | [1] 30 | 10 | 100 | 18.2 | Do. |

[1] Vinyltoluene (approximately 65 percent meta-vinyltoluene and 35 percent para-vinyltoluene).

EXAMPLE 3

A charge of 100 parts by weight of a mixture of 100 parts of powdered polyvinyl chloride, 3 parts of dibutyl tin-S,S'-bis(3,5,5-trimethylhexyl mercapto acetate) and 1 part of white mineral oil, and 10 parts of a rubbery copolymer of 30 percent by weight of methyl isopropenyl ketone, 20 percent of 2,5-dichlorostyrene and 50 percent of butadiene, was milled on compounding rolls at a temperature of 340° F. to obtain a uniform composition, employing procedure similar to that employed in Example 2. A portion of the composition was compression molded to form a sheet ⅛ inch thick. A clear substantially transparent sheet was obtained. Test pieces were cut from the molded sheet and tested by procedure similar to that employed in Example 1. The composition had a notched impact strength value of 7.2 foot-pounds.

EXAMPLE 4

A charge of 100 parts by weight of a polyvinyl chloride mixture similar to that employed in Example 3, and 10 parts by weight of a rubbery copolymer of 35 percent by weight of alpha-methylstyrene, 20 percent of methyl isopropenyl ketone and 45 percent of butadiene was compounded on heated rolls to obtain a uniform composition, employing procedure similar to that employed in Example 2. The product was compression molded and tested employing procedures similar to those employed in Example 1. The molded product was a clear transparent composition having a notched impact strength of 24.2 foot-pounds.

EXAMPLE 5

A composition similar to that described in Example 4 was prepared from 100 parts of a polyvinyl chloride mixture similar to that employed in Example 3, and 10 parts of a rubbery copolymer of 35 percent by weight of 3,5-dimethylstyrene, 20 percent of methyl isopropenyl ketone and 45 percent of butadiene, by compounding the ingredients into a uniform composition employing procedure similar to that employed in Example 2. The molded composition was substantially transparent and had a notched impact strength of 23.1 foot-pounds.

EXAMPLE 6

A composition similar to that described in Example 4 was prepared from 100 parts by weight of polyvinyl chloride and 10 parts of a rubbery copolymer of 25 percent by weight of p-ethylchlorostyrene, 25 percent of methyl isopropenyl ketone and 50 percent of butadiene, employing procedure similar to that employed in Example 2. The molded composition was substantially transparent and had a notched impact strength of 17.5 foot-pounds.

EXAMPLE 7

In each of a series of experiments, a charge of a mixture of 100 parts by weight of polyvinyl chloride, 3 parts of dibutyl tin-S,S'-bis(3,5,5-trimethylhexyl mercapto acetate) as stabilizer and 1 part of white mineral oil, in amount as stated in the following table was heat-plastified by milling the same on compounding rolls at a temperature of 340° F. for a period of 2 minutes. Thereafter, a copolymer of 60 percent by weight of butadiene and 40 percent of styrene prepared by procedure and recipe similar to that described in Example 1 was added to the heat-plastified polyvinyl chloride on the rolls in amount as stated in the following table. The resulting mixture was milled on the rolls at a temperature of 340° F., then was removed and allowed to cool. Portions of the composition were compression molded to form test pieces of ⅛ x ½ inch cross section. These test pieces were employed to determine a notched impact strength for the composition employing procedure similar to that described in ASTM D256–47T. Table II identifies the rubbery copolymer by giving the monomeric ingredients employed in making the same. The table gives the parts by weight of the rubbery copolymer and the stabilized polyvinyl chloride employed in making the composition. The table also gives a notched impact strength value for the composition. For purpose of comparison, compositions were prepared employing the rubbery copolymer in proportions outside the scope of the invention, namely in amounts of 20 to 25 percent by weight of the composition. The notched impact strength for these compositions is reported in the table.

Table II

| Run No. | Copolymer Monomer Starting Materials | | Composition Polymer Starting Materials | | Product Properties | |
|---|---|---|---|---|---|---|
| | $C_4H_6$, percent | Styrene, percent | Copolymer, wt. gms. | Polyvinyl chloride, gms. | Notched Impact Strength, ft.-lbs. | Color |
| 1 | 60 | 40 | 5 | 95 | 3.76 | Clear. |
| 2 | 60 | 40 | 10 | 90 | 15.4 | Do. |
| 3 | 60 | 40 | 15 | 85 | 13.0 | sl. haze. |
| 4 | 60 | 40 | 20 | 80 | 1.56 | opaque. |
| 5 | 60 | 40 | 25 | 75 | 0.83 | Do. |

EXAMPLE 8

In each of a series of experiments, compositions were prepared from stabilized polyvinyl chloride similar to that employed in Example 7 and a rubbery copolymer of 40 percent by weight of butadiene and 60 percent of styrene which rubbery copolymer was prepared employing a recipe and procedure similar to those employed in Example 1. The compositions were prepared by milling the heat-plastified polymeric ingredients on compounding rolls employing procedure similar to that employed in Example 7. Table III identifies the compositions and gives the notched impact strength determined for the product. For purpose of comparison, compositions containing the rubbery copolymer in proportions outside the scope of the invention were prepared and tested. The notched impact strength for these compositions are reported in the table.

Table III

| Run No. | Copolymer Monomer Starting Materials | | Composition Polymer Starting Materials | | Product Properties | |
|---|---|---|---|---|---|---|
| | $C_4H_6$, percent | Styrene, percent | Copolymer, wt. gms. | Polyvinyl chloride, gms. | Notched Impact Strength, ft.-lbs. | Color |
| 1 | 40 | 60 | 5 | 95 | 3.2 | clear. |
| 2 | 40 | 60 | 10 | 90 | 15.4 | sl. haze. |
| 3 | 40 | 60 | 15 | 85 | 4.8 | Do. |
| 4 | 40 | 60 | 20 | 80 | 1.07 | opaque. |
| 5 | 40 | 60 | 25 | 75 | 0.66 | Do. |

EXAMPLE 9

In each of two experiments, a charge of 100 grams of a mixture of 100 parts by weight of polyvinyl chloride, 3 parts of dibutyl tin-S,S'-bis(3,5,5-trimethylhexyl mercapto acetate) as stabilizer and 1 part of white mineral oil, and 10 grams of a rubbery copolymer of 60 percent by weight of butadiene and 40 percent of styrene was milled together on compounding rolls to form a homogeneous composition. In experiment A, the stabilized polyvinyl chloride was placed on the rolls and milled at a temperature of 340° F. for a period of 2 minutes. Thereafter, 10 grams of the rubbery copolymer was added to the heat-plastified polyvinyl chloride on the rolls. The resulting mixture was milled on the rolls at a temperature of 340° F. for a period of 10 minutes then was removed and allowed to cool. It was a uniform composition. A portion of the composition was compression molded to form test pieces. They were transparent. In experiment B the 10 grams of rubbery copolymer was placed on the compounding rolls and was milled at a temperature of 340° F. for a period of 2 minutes. Thereafter, the 100 grams of stabilized polyvinyl chloride was added to the heat-plastified rubber on the rolls. The resulting mixture was milled on the rolls at a temperature of 340° F. for a period of 10 minutes, then was removed and allowed to cool. It was a uniform composition. A portion of the composition was compression molded to form test pieces. They were transparent. A notched impact strength was determined for the composition employing procedure similar to that described in ASTM D256-47T. Other of the test pieces were allowed to stand at room temperature and were observed for color and appearance 24 hours after they were molded. The properties and appearance of the composition were as follows:

|  | A | B |
|---|---|---|
| Notched impact strength | 15.4 | 0.73 ft.-lbs. |
| Color as initially prepared | Transparent | Transparent. |
| Color after 24 hours | do | opaque. |

We claim:

1. A thermoplastic composition comprising an intimate mixture of from 85 to 95 percent by weight of polyvinyl chloride and from 15 to 5 percent of a rubbery copolymer of from 40 to 60 percent by weight of butadiene-1,3 and from 60 to 40 percent of at least one copolymerizable monomer selected from the group consisting of monovinyl aromatic hydrocarbons of the benzene series and nuclear chlorinated derivatives thereof containing from 1 to 2 chlorine atoms in the aromatic nucleus and mixtures of from 10 to 90 percent by weight of at least one such monovinyl aromatic compound and from 90 to 10 percent of methyl isopropenyl ketone.

2. A thermoplastic composition as claimed in claim 1, wherein the rubbery copolymer is a copolymer of from 40 to 60 percent by weight of butadiene-1,3 and from 60 to 40 percent of a monovinyl aromatic hydrocarbon of the benzene series.

3. A thermoplastic composition as claimed in claim 1, wherein the rubbery copolymer is a copolymer of from 40 to 60 percent by weight of butadiene-1,3, from 5 to 30 percent of methyl isopropenyl ketone and the remainder of a monovinyl aromatic hydrocarbon of the benzene series.

4. A thermoplastic composition as claimed in claim 1, wherein the rubbery copolymer is a copolymer of from 40 to 60 percent by weight of butadiene-1,3 and from 60 to 40 percent of styrene.

5. A thermoplastic composition as claimed in claim 1, wherein the rubbery copolymer is a copolymer of from 40 to 60 percent by weight of butadiene-1,3 and from 60 to 40 percent of vinyltoluene.

6. A thermoplastic composition as claimed in claim 1, wherein the rubbery copolymer is a copolymer of from 40 to 60 percent by weight of butadiene-1,3 and from 5 to 30 percent of methyl isopropenyl ketone and the remainder styrene.

7. A process for making a composition of matter which comprises heat-plastifying polyvinyl chloride and when the polyvinyl chloride is heat-plastified throughout intimately incorporating with the heat-plastified polyvinyl chloride a rubbery copolymer of from 40 to 60 percent by weight of butadiene-1,3 and from 60 to 40 percent of at least one copolymerizable monomer selected from the group consisting of monovinyl aromatic hydrocarbons of the benzene series and nuclear chlorinated derivatives thereof containing from 1 to 2 chlorine atoms in the aromatic nucleus and mixtures of from 10 to 90 percent by weight of at least one such monovinyl aromatic compound and from 90 to 10 percent of methyl isopropenyl ketone, said rubbery copolymer being intimately incorporated with the polyvinyl chloride in proportions of from 5 to 15 percent by weight of the rubbery copolymer and from 95 to 85 percent by weight of the polyvinyl chloride and by mechanically working the heat-plastified polymeric ingredients in admixture with one another at temperatures between 165° and and 225° C.

References Cited in the file of this patent

UNITED STATES PATENTS

| 2,647,101 | Humphrey et al. | July 28, 1953 |
| 2,739,082 | Bezman | Mar. 20, 1956 |
| 2,803,621 | Schwartz et al. | Aug. 20, 1957 |

OTHER REFERENCES

Smith: "Blends of Polyvinylchloride with Rubbers," India Rubber World, volume 129, pages 785–786 (March 1954).